United States Patent
Xu

(10) Patent No.: US 8,382,067 B2
(45) Date of Patent: Feb. 26, 2013

(54) STEM SEAL

(75) Inventor: Changxiang Xu, Wenzhou (CN)

(73) Assignee: Zhejiang China Valve Co., Ltd, Wenzhou (CN)

( * ) Notice: Subject to any disclaimer, the term of this patent is extended or adjusted under 35 U.S.C. 154(b) by 660 days.

(21) Appl. No.: 12/064,561

(22) PCT Filed: Aug. 23, 2006

(86) PCT No.: PCT/CN2006/002156
§ 371 (c)(1), (2), (4) Date: Apr. 8, 2008

(87) PCT Pub. No.: WO2007/022721
PCT Pub. Date: Mar. 1, 2007

(65) Prior Publication Data
US 2008/0217568 A1  Sep. 11, 2008

(30) Foreign Application Priority Data
Aug. 23, 2005 (CN) .......................... 2005 1 0097905

(51) Int. Cl.
*F16K 31/44* (2006.01)
(52) U.S. Cl. .......................... 251/214; 277/579
(58) Field of Classification Search .................. 251/214, 251/315.01; 277/579, 530–532
See application file for complete search history.

(56) References Cited

U.S. PATENT DOCUMENTS

| | | | | |
|---|---|---|---|---|
| 1,197,480 A * | 9/1916 | Griffith | ........................ | 251/214 |
| 3,425,663 A * | 2/1969 | Priese | ........................ | 251/214 |
| 3,458,172 A * | 7/1969 | Burrows | ........................ | 251/214 |
| 3,614,063 A * | 10/1971 | Gachot | ........................ | 251/355 |
| 4,317,573 A * | 3/1982 | Karkkainen | ................... | 277/510 |
| 4,546,790 A * | 10/1985 | Huber et al. | ............. | 137/315.19 |
| 4,558,874 A * | 12/1985 | Williams et al. | ............... | 277/522 |
| 4,930,748 A * | 6/1990 | Gonsior | ........................ | 251/163 |
| 5,407,176 A * | 4/1995 | Nevrekar | ...................... | 251/214 |
| 6,076,831 A | 6/2000 | Pfannenschmidt | | |
| 6,129,336 A | 10/2000 | Kirk | | |

FOREIGN PATENT DOCUMENTS

| | | |
|---|---|---|
| CN | 1475874 | 3/2000 |
| CN | 2512960 | 9/2002 |
| CN | 1447054 | 10/2003 |
| CN | 1475687 | 2/2004 |
| JP | 2002-61760 | 2/2002 |

OTHER PUBLICATIONS

Technical Committee ISO/TC 10, Technical drawings—Tolerancing of linear and angular dimensions, ISO 406 Second Edition, Oct. 1, 1987, International Organization for Standardization, Switzerland.
Xomox Corporation, 2001 Catalog, 2005, pp. 1-7, Xomox Corporation, USA.

* cited by examiner

*Primary Examiner* — John K Fristoe, Jr.
*Assistant Examiner* — Andrew J Rost

(57) ABSTRACT

Any stem seal using either a triangle-sectional bushing or ring as stem cylinder seals or a ball wedge/spherical socket mating arrangement as stem shoulder seals can individually withstand the same pressure as the burst pressure of bodies without failure. The sectional triangle of the triangle-sectional bushing or ring is truncated to provide a wearing and compressing allowance for the bushing or ring, and so will be again a full triangle or an untruncated triangle when the bushing or ring is fully worn. The ball wedge/spherical socket mating is a mating which uses ball wedges as a stop shoulder of stems and the spherical socket as a stop socket at stem exits.

11 Claims, 4 Drawing Sheets

STEM SEAL

TECHNICAL FIELD

The invention relates to stem seals for movable stems, and more particularly to a stem cylinder seals and a stem shoulder seal for movable stems.

BACKGROUND ART

Many machines or devices include stems, variously referred as pins, shafts, spindles, etc., extending from a fluid-containing member to transmit power into or out of it. All these stems or spindles need sealing to prevent the fluid from leaking around the stem, but some stems dispose one seal either at the stem cylinder or at the stem shoulder, and some stems dispose both the two.

For example, valves, as the controlling unit for fluid conveying, have a valving member, such as the ball in ball valves, the gate in gate valves, etc. The valving member is interposed in a flow path, and has an open position, which allows medium to flow through the valve, and a closed position, which prevents medium from flowing through the valve. The shifting of the valving member between the two positions is realized by a stem extending out of the valve. The stem needs sealing to prevent medium from leaking around the stem out of the valve into atmosphere. However, some valves need only one seal either for stem cylinders or for stem shoulders, and other valves need both the two.

Stems, such as stems for ball valves or gate valves, shall not be ejected through the pressure boundary by internal pressure when the stem packing and/or retainer have been removed in accordance with the related standards, so that the stem shall have a stop shoulder to be pressed against the inside of stem exits to prevent the stem from being removed through the stem exit opening at the bottom of the stuffing box of valves. That is to say, the stem, particularly the stem of ball valves, has two seals, one stem shoulder seal located at the inside of the stem exit and one stem cylinder seal starting at the outside of the stem exit and extending through the stuffing box. When assembled, the stuffing around the stem is compressed against the bottom of the stuffing box starting at the outside of the stem exit by glands, Belleville washers and the nut engaged by thread with the stem to provide a cylinder seal for the stem, and at the same time the stop shoulder of the stem is pulled tight against the inside of the stem exit opposite the bottom of the stuffing box to provide a shoulder seal for the stem.

The conventional metal stem stop shoulder is a plain (see FIG. 3a) or taper (see FIG. 3b) flange on stems, and needs a plain or conical gasket between the stop shoulder and its thrust step at the inside of stem exits, which provides a metal-to-non-metal stem shoulder soft seal. Patent U.S. Pat. No. 6,129,336 also disclosed a metal-to-non-metal stem shoulder soft seal using a ball shoulder as the stem stop shoulder and a spherical gasket as the thrust gasket between the stop shoulder and its thrust step. A leak will happen to the plain and the conical assemblies and not happen to the spherical assembly which may turn about the sphere center when the stem inclines under operational and non-operational loads.

The conventional packing as stem cylinder seals is a group of either plain rings (see FIG. 3a) or V-rings (see FIG. 3b). These grouped packing rings rely on axial compressing forces to accomplish at the same time the stem cylinder seal, preventing medium from leaking along stem, and the box seal, preventing medium from leaking along box wall. The box seal is a static seal easy to be accomplished, and the stem cylinder seal is often a dynamic stem seal difficult to be accomplished. Consequently, realizing the stem cylinder seal is naturally critical for the accomplishment of stem seals, and inherently needs a radial compression of packing for providing a radially sealing stress. However, the packing can only be compressed by an originally axial force. Thus it is critical for realizing the stem cylinder seal to enable the packing to obtain a radially compressing component from an originally axially compressing force or a radial movement from an originally axially compressing movement.

It is well known that any packing material in stuffing boxes, if its supporting and its compressing planes both are square to stem axis, can have a radial movement only when it is axially compressed to yield and deform, whereas, if both are a cone not friction-locked for the radial movement, only the local material in contact with the conical surfaces may radially be compressed to move because forces are axially decreasedly transmitted in packing material with frictional resistance. That is to say, there are altogether two ways to enable the packing to yield an efficient radial sealing movement; one is to enable the whole packing to fully yield and deform to get some packing material a bi-radial movement, and the other is to enable the whole packing to suitably radially shrink to get the packing material a uni-radial movement. To accomplish a stem cylinder seal, the packing in bi-radial movements needs a full radial restriction from boxes, and the packing in uni-radial movements needs full support and compression from cones. The bi-radial movement subject to the yield and deformation of material needs the packing to be compressed to a fully yielded and deformed state, and so it is possible to exhaust the allowable strength of packing material regardless of whether the working pressure is low or high. The uni-radial movement subject to a shrinking deformation may only need the packing material to deliver a suitable strength in accordance with the sealing requirement or may not need to exhaust the allowable strength for no reason. The grouped square-sectional rings shown in FIG. 3a, with a premade fitting interference, are piece by piece assembled into the box by a little flex deformation, and then fully stuffed into and conformed to the space between the box wall and the stem by stretching and deforming under heavy compression, which needs a full radial restriction from boxes. The V-rings in sets shown in FIG. 3b are fully stuffed into and conformed to the space by mutually-squeezing deformation from their cross-sections under heavy compression, which also needs a full radial restriction from boxes. Actually, all the shaped-rings including V-rings rely on the wedging function of triangles to yield a bi-radial movement as V-rings do, and all need a full radial restriction from boxes. It may be said that all the prior stem cylinder seals are realized not by a fully cone-supported and compressed integral bushing or ring, but by a group or a set of rings mutually-squeezed and deformed in the stuffing box regardless of whether their cross-sections are rectangular or V-shaped or others and whether or not they have a small conical surface used to support and compress them, i.e. all the prior stem cylinder seals are of a boxed seal, a seal with a packing-restricting box, but not a boxless seal. As for the boxed seal:

The first, it is well known that any sealing packing shall be easily deformed under compression; otherwise it can not be used as the sealing stuff filling any unevenness in the jointing surface. So it is beyond any doubt that any V-packing rings and the other shaped packing rings in sets are no rigid body, and will deform to become a packing with an integral-sectional function or to change into a non-wedged body from a wedged body and lose the mechanical characteristic as their original sectional shapes when compressed to some extent, one embodiment of which is that these grouped rings, after compressed to some extent, may not be separated without an externally stripping force, and another embodiment of which is not that the more they are compressed, the higher medium pressure they withstand after compressed to some extent and far before compressed to a broken state.

The second, it is imaginable that any shaped-packing rings in sets will have two opposite deformations at the same time from different partial sections when compressed to deform; one may be a radial increase of partial sections doing sealing work, and the other may be a radial decrease of partial sections doing unsealing work. For example, female Vees always expand to do sealing work, and male Vees always contract to do unsealing work. So any set of packing rings with shaped-sections will always work in such a way that the more they are compressed, the fewer the sealing surface becomes, and the more concentrated the sealing stress becomes to fast exceed the material strength limit and result in a sealing failure, even if they do not yet lose their mechanical characteristics when compressed to some extent. For example, the intermediate V-ring always has a female Vee at its one side, and a male Vee at its other side, with its female Vee expanded to do sealing work and with its male contracted to do unsealing work during being compressed. If Vees do not yet lose their wedging function when compressed to some extent, they may finally have only one external edge circle of female Vees doing sealing work, which both wastes sealing material and has no working reliability. Therefore, any set of packing rings with a shaped-section, particularly for high pressure medium service, should be designed or considered according to some non-wedged bodies or finally regarded as some stuffing material without any wedging function; if not so designed, they will have a worst material-utilizing ratio and a worst working reliability.

The last, it can be seen from the above-analyzed that all the boxed seals are to have their packing fully stuffed into and conformed to the space between the box wall and the stem to finally become one packing with an integral-sectional function and without any interference with its both stuffed box and sealed stem regardless of whether it is in sets or in groups or not, i.e. any packing of all the boxed seals finally relies on transverse strains given by Poisson's ratio to provides radial sealing stresses. The Poisson's ratio of usual sealing material is less than 0.5, such as PTFE with a Poisson's ratio of 0.46, and so the axial strain and stress in the boxed sealing packing are respectively at least 2 times its radial strain and stress; in other words, the maximum load stress in the boxed sealing packing will be at least 2 times its stem-sealing stress after compressed to some extent if the resistance to packing deforming motion is neglected; i.e. the boxed seal may have only a half strength (allowable stress) of sealing material used for stem cylinder seals at most. Thus, to make use of a limited sealing stress or capacity of the boxed sealing packing for a higher medium pressure, the boxed seal has to have a medium-leaking path extended by increasing the axial height of packing, whereas increasing the height is equivalent to decreasing the sealing stress. To keep the sealing stress not changed, it has to have an axial load increased again. To keep the axial stress within the material's allowable stress after increasing the axial load, it has to have an axially force-receiving area increased by increasing the radial dimension of packing again. However, the larger dimension or the more material increased, the more maldistribution of strains and stresses of packing, and the more sealing material wasted. Therefore, the boxed seal is only of one inefficient sealing construction.

Besides, the boxed seal has a stem-embracing force both axially maldistributed because the compressing force is axially progressively decreased, and radially maldistributed because the stem, the packing, the box and the gland can not be in a coaxial or symmetrical assembly, and so when compressed to obtain an integral seal, will have a packing over-compressed to be easy to be worn at some points. That is to say, the boxed seal design has a lower material availability and a lower material wearing resistance. The sealing power is axial to make at first directly the stem shoulder seal operative and then indirectly the stem cylinder seal operative, particularly for the plain packing ring design (see FIG. 3a), and so the stem-sealing actions at the shoulder and the cylinder are out of phase and result in that the sealing gasket at the stem shoulder is often worn or broken when the cylinder seal is operative. Although the V-rings (see FIG. 3b) may provide a radial component with the packing before losing their wedging function as rigid bodies, the air bubble enclosed between male and female V-rings will have a too volumetric change for both the packing seal and the Belleville washer's regulation to be operative in response to temperature and pressure changes, and makes the V-packing ring return back to the same level as the plain ring.

Clause 7.1.1 of ASME B16.34-2004 specifies that valve shells shall withstand a minimum of 1.5 times pressure rating with the valve in the partially open position or including the stem packing, but clause 7.1.3 additionally specifies that leakage through the stem packing shall not be the cause for rejection, and that stem seals shall be capable of retaining pressure at least equal to the 38° C. rating without visible leakage when incapable of withstanding 1.5 times rating. So specify API 6D/ISO 14313 and the other valve standards. That is to say, the prior stem sealing art can not meet the actual requirement so that the valve standards have to make a concession to stem seals by lowering the valve reliability.

In Europe, valve manufacturers have to add one or two O-sealing rings on the stem with the prior packing seal in order to meet the requirement from German TA Luft (Technical Instructions on Air Quality Control).

If the stem-embracing component for stem cylinder seals could be provided by an integral bushing or ring fully supported and compressed between two cones but not by a set of packing rings fully compressed to yield and deform in stuffing boxes, a selection of the two conical angles could adjust both the magnitude of the resultant force radially compressing on the sealing bushing or ring and the matching characteristic of stem cylinder seals and stem shoulder seals. If the radial resultant stress on the sealing bushing or ring could be adjusted to one not less than any other directional stresses, mightn't the stem cylinder seal have all the strength (allowable stress) of sealing material used for the sealing of the stem cylinder and double meet the requirements from ASME standards and TA Luft instructions? If there was a stem shoulder seal matching with such a stem cylinder seal, mightn't the two combined stem seals dually double meet the requirements from ASME standards and TA Luft instructions?

DISCLOSURE OF THE INVENTION

The first object of the invention is to provide a cylinder seal with radially stem-embracing components for movable spindles, shafts or stems. The second object of the invention is to provide a shoulder seal for movable spindles, shafts or stems. A third object of the invention is to provide for movable spindles, shafts or stems a combined stem seal including a cylinder seal and a shoulder seal, which can individually withstand a maximum of 1.5 times valve pressure rating and can double meet the requirements from American ASME standards and German TA Luft instructions.

The stem cylinder seal of the invention is a triangle-sectional bushing or ring of stem cylinder seals, compressed fully within two opposing conical sockets around a movable stem therethrough and not needing any restriction from stuffing box, one of the said conical sockets or the upper socket being integrated in a gland, and the other or the lower socket being integrated at the outside of the thrust step of an exit opening of the said movable stem extending out of a cavity; wherein the section of the said bushing is a truncated triangle, the untruncated side of the said truncated triangle being the generatrix of the cylindrical inner surface of the said bushing used for sealing the said stem cylinder, a truncated side of the said truncated triangle being the generatrix of a taper outer surface used for sealing the said lower conical socket, the other truncated side of the said truncated triangle being the generatrix of the other taper outer surface of the said bushing used for receiving the compression from the said gland, and the truncating side of the said truncated triangle being the generatrix of the short cylindrical outer surface of the said bushing used for providing a wearing and compressing allowance for the said bushing. A radial force compounded by the compressing force from the gland and the reacting force from the lower conical socket is applied to the cylindrical outer surface formed by the truncating side, and so the stem cylinder seal assembly of the invention does not need any stuffing box again, or the sealing material of the invention does not again need any restriction from stuffing boxes and, being able to swing free with stems, has a radially stem-embracing component so evenly and so symmetrically as to be able to provide a seal high efficient, sensitively compensated and wear-resistant for movable stem cylinders. Besides, the triangle-sectional bushing or ring of stem cylinder seals has no air bubble, and so has a high reliability when temperature changes.

It has been proved by tests that the triangle-sectional bushing or ring used as the seal of valve stems can withstand the same pressure as the burst pressure of valve bodies without failure. In general, the burst pressure of valve bodies may be equal to 4 times pressure rating of the valve. That is to say, the triangle-sectional bushing stem seal have the same reliability as the valve body, and can double meet the requirements from German TA Luft instructions.

The stem shoulder seal of the invention is a ball wedge/spherical socket mating arrangement, comprising a ball wedge or spherical shoulder integrated at a movable stem end and a spherical socket integrated at the inside of the thrust step of an exit opening of the said movable stem extending out of a cavity, wherein the said spherical shoulder is so diametrically either equal to or economically slightly bigger than the said spherical socket and the sphere's center of the said spherical socket is so economically slightly off the edge circle plane of the said spherical socket for a distance δ as to ensure the first mating contact or the initial mating contact is only at the said edge circle and close to the sphere's great circle (whose center is the same as the sphere's center) of the said spherical shoulder or as to make the said spherical shoulder be a small angle of wedges relative to the said spherical socket or as to make the said stem shoulder seal be a positive ball wedge/spherical socket mating arrangement with a small wedging angle tending to zero degree, which will tend to result in an infinite force for the said ball wedge or spherical shoulder to wedge the said spherical socket under a small operating force passing the center of the said spherical shoulder; whereby the mating of a hardened metal ball wedge and a soft metal spherical socket will, like a seal of metal to non-metal, accomplish sealing as soon as the said ball wedge touches the said spherical socket by a small operating force, and further more the said mating contact, provided the ball wedge is still adequately round, will be always on the spherical surface of the said hardened ball wedge without any diametrical change and will be getting more and more as operated, no matter how the said ball wedge rotates and deflects and how the said ball wedge squeezes and wears its mating socket during each operations, i.e. the rotating and the deflecting of the said ball wedge do not affect the integrity of seals, and the more wear, the tighter the closure of the mating and the more resistant to the wear.

It has been proved that the mating of ball wedges and spherical sockets used as the valve stem stop shoulder seal can withstand the same pressure as the burst pressure of valve bodies without failure. In general, the burst pressure of valve bodies may be equal to 4 times pressure rating of the valve. That is to say, the mating of ball wedges and spherical sockets, when used as the stem stop shoulder seal, have the same reliability as the valve body, and can double meet the requirements from German TA Luft instructions.

It is imaginable that a movable stem with a triangle-sectional bushing or ring of stem cylinder seals and a ball wedge/spherical socket mating arrangement of stem shoulder seals can dually double meet the requirements from American German TA Luft instructions.

BEST MODE OF CARRYING OUT THE PRESENT INVENTION

Figure 1:
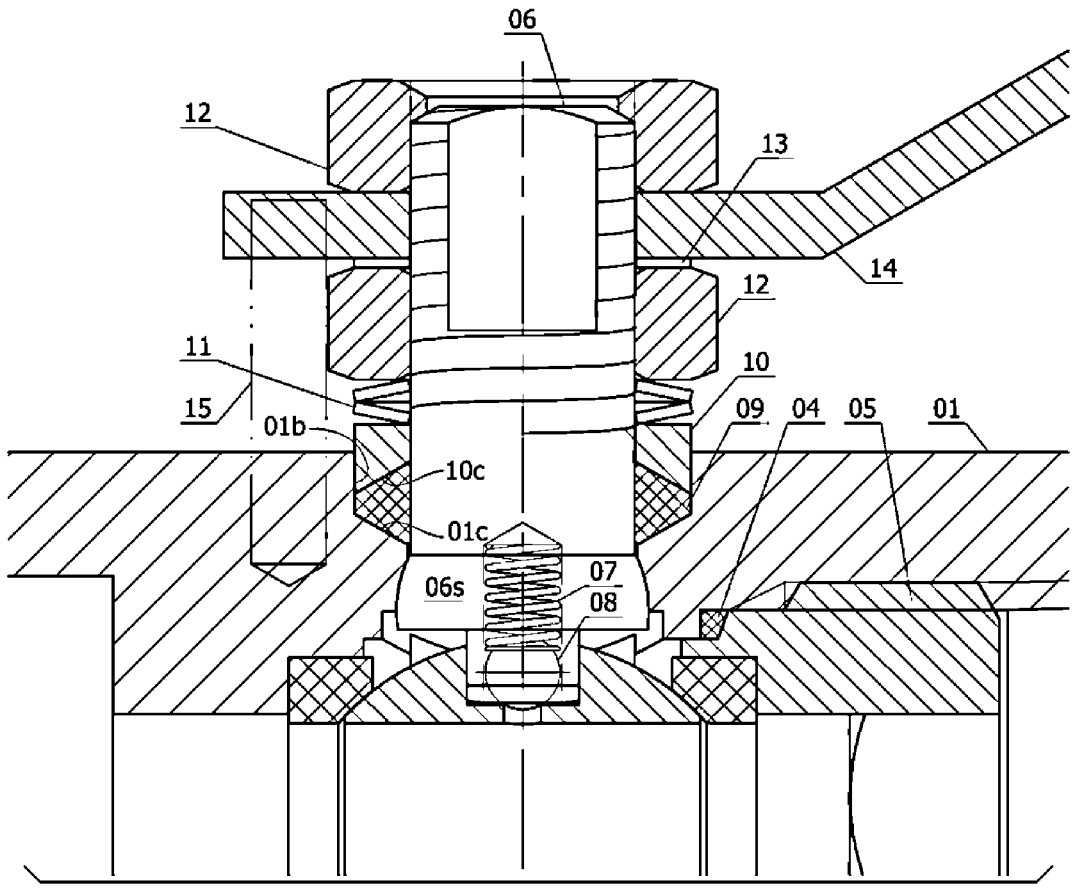
FIG. 1 is a stem assembly of ball valves including a triangle-sectional bushing of stem cylinder seals and a ball wedge/spherical socket mating arrangement of stem shoulder seals in accordance with the invention, shown in partially cross-sectional elevation.

What is shown in FIGS. 1, 6, 7 and 8 is the same ball valve, a one-body type ball valve. In these four drawings, each like reference numeral indicates the same component. In the ball valve, there is a flow controlling path assembly and a stem sealing assembly. The flow controlling path is formed of a ball 03 and two seats 02 fixed in a body 01 by an insert 05 engaged into the body by fastening threads. The ball 03 with a through hole is captured between the seats 02, and can be turned by a stem 06 with a handle 14 or an actuator to provide a fully open position, a partially open position and a fully closed position for flow control. The stem sealing assembly includes a triangle-sectional bushing or ring of stem cylinder seals and a ball wedge/spherical socket mating arrangement of stem shoulder seals (see FIGS. 1 and 5). The triangle-sectional bushing or ring 09 is clamped around the stem 06 against the bushing's lower conical socket 01c at the stem exit of the body 01 by a gland 10 with a bushing's upper conical socket 10c, Belleville washers 11 and a nut 12 engaged with the stem to provide a cylinder seal for the stem. The ball wedge/spherical socket mating arrangement comprises a ball wedge shoulder 06s on the stem 06 and a spherical socket 01s in the body 01. As the triangle-sectional bushing or ring 09 is clamped against its conical socket 01c to provide a cylinder seal for the stem 06, the ball wedge shoulder 06s is pulled against its spherical socket 01s to provide a shoulder seal for the stem 06.

Figure 2:
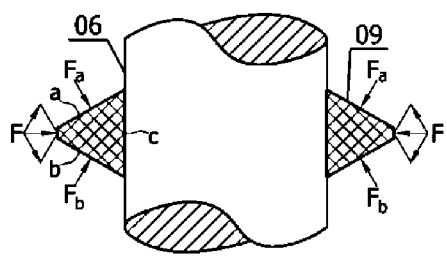
FIG. 2 is the triangle-sectional bushing or ring around the stem cylinder taken out of the stem assembly of FIG. 1, used to illustrate the working principle of the triangle-sectional bushing or ring for stem cylinder seals in accordance with the invention.

What FIG. 2 shows is the triangle-sectional bushing or ring 09 around the stem 06 taken out of the stem sealing assembly of FIG. 1, where $F_a$ is the clamping force from the conical socket 10c in the gland 10, $F_b$ is the reacting force from the conical socket 01c in the body 01, and F is the resultant force of $F_a$ and $F_b$. Because the resultant F is radially applied on the external surface of the triangle-sectional bushing or ring 09, the sealing bushing or ring does not need again to be restricted by a stuffing box 01b as the conventional packing shown in FIGS. 3a and 3b does, and, being able to swing free with the stem, has a very even and symmetrical stem-embracing component, a big resistance to wear, and a very high efficiency of axial clamping power to make the Belleville washer 11 become more effective and more sensitive for the compensation of wear and temperature changes.

The triangle-sectional bushing or ring of stem cylinder seals of the invention, as mentioned above, can not need any intermediate cylindrical periphery used for receiving a radial restriction from stuffing box, but has to still need a short length of intermediate cylindrical periphery used for providing a wearing and compressing allowance for itself, and therefore its section, as shown in FIGS. 1~2, is a truncated equilateral triangle whose truncated side a is the generatrix of its taper outer surface used for being clamped by its upper conical socket 10c in the gland 10, whose truncated side b is the generatrix of its taper outer surface used for being supported by its lower conical socket 01c in the body 01, whose untruncated side c is the generatrix of its cylindrical inner surface used for sealing the stem at the cylinder, and whose truncating side or the resultant F action side in the FIG. 2 is the generatrix of its intermediate cylindrical periphery used for providing a wearing and compressing allowance for itself.

Figure 4:
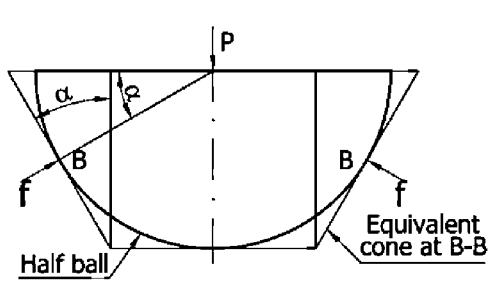
FIG. 4 is a half ball supported by a socket edge at a sphere's small circle (whose center not the same as the sphere's center) of the half ball, used to illustrate the working principle of the ball wedge/spherical socket mating arrangement in accordance with the invention.
Figure 5:
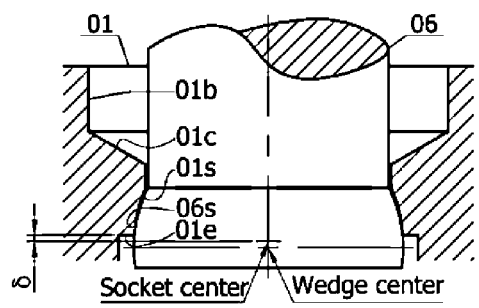
FIG. 5 is the ball wedge/spherical socket mating arrangement taken out of the stem assembly of FIG. 1, used to illustrate the disposition and the work of the mating arrangement of stem shoulder seals in accordance with the invention, shown in cross-sectional elevation.
Figure 7:
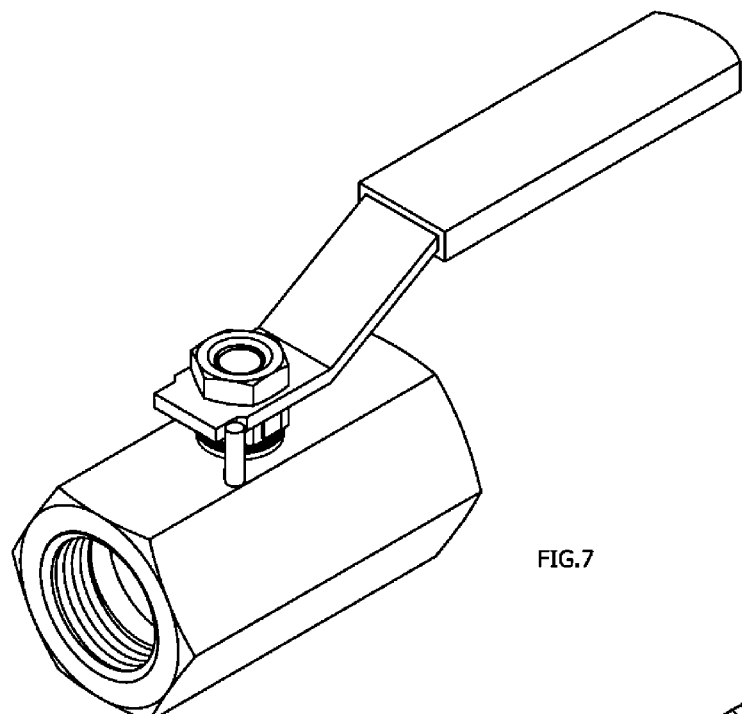
FIG. 7 is an assembled perspective view of FIG. 6, and FIG. 8, a disassembled perspective view of FIG. 6.
Figure 6:
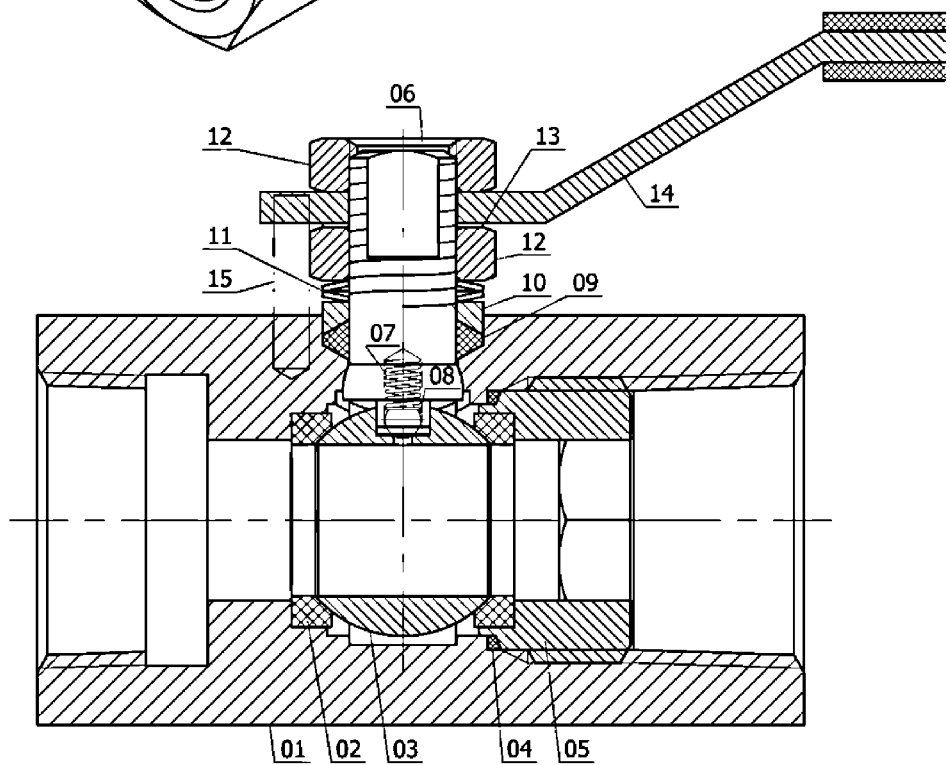
FIG. 6 is a one-body type of ball valves including a triangle-sectional bushing or ring of stem cylinder seals and a ball wedge/spherical socket mating arrangement of stem shoulder seals in accordance with the invention, shown in cross-sectional elevation.
Figure 8:
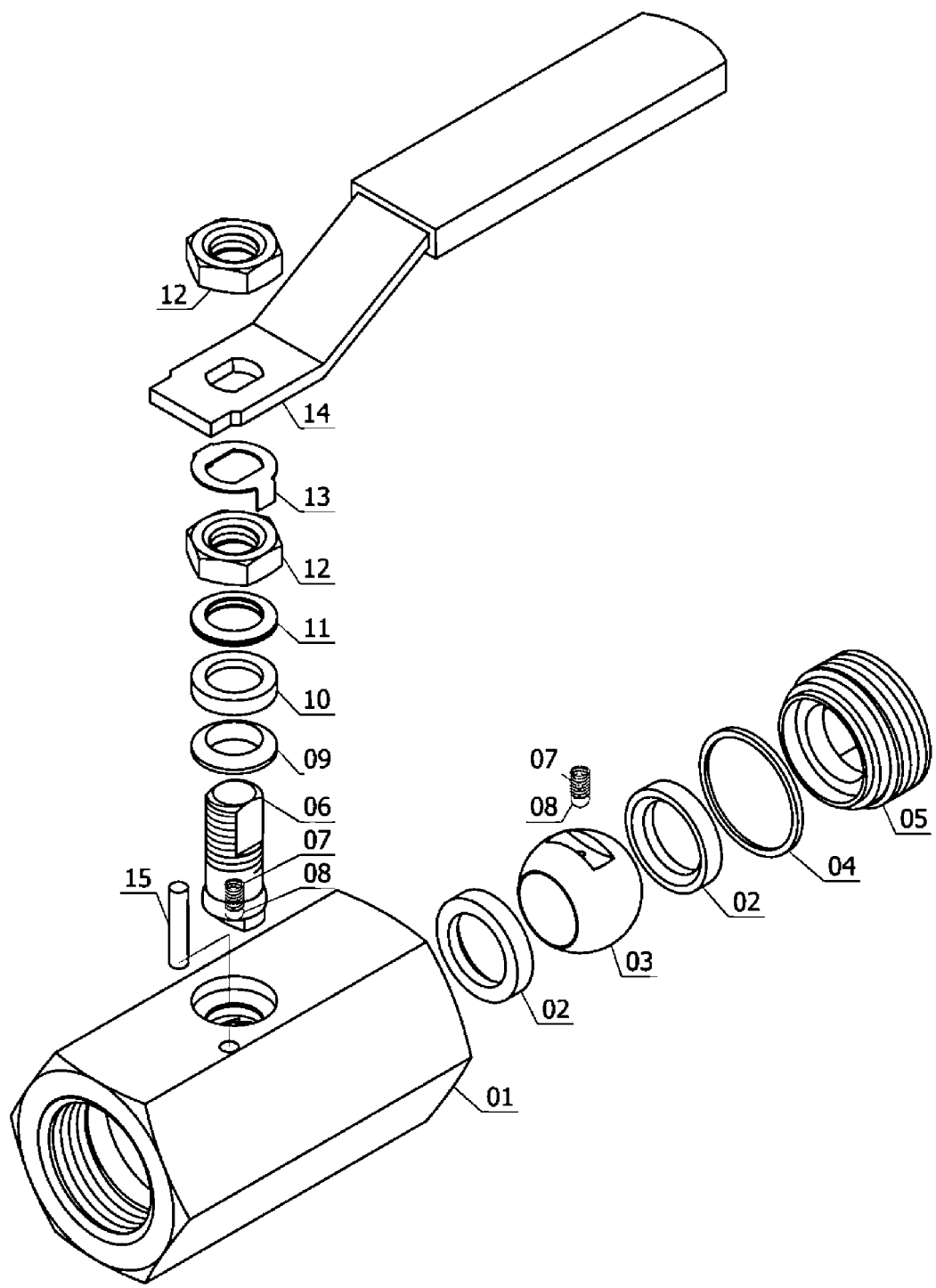

As shown in FIG. 4, a half ball supported by a socket edge B-B is equivalent to a ball wedge relative to the socket, and when a power P is applied to the ball center, can produce two forces f to the socket at points B: $f=P/(2 \sin \alpha)$, where $\alpha$ is the wedge angle of the ball wedge or the equivalent cone of the ball at point B. From the formula, it can be seen that the nearer to the sphere's great circle (whose center the same as the sphere's center) of the ball the supporting point B, the smaller the wedge angle $\alpha$, and the stronger the wedging function of the ball; as the point B is close to the sphere's great circle of the ball or as the wedge angle $\alpha$ is close to zero, the force $f=P/(2 \sin \alpha)$ for the ball to squeeze its mating socket at its edge B-B tends to be infinite. The ball wedge/spherical socket mating seal for stem shoulders is a kind of stem shoulder seals utilizing the wedging function of balls, where the stem-retaining seat in the body 01, as shown in FIG. 5, is a spherical socket 01s with its sphere's center so slightly off its edge circle plane 01e for a distance δ, such as δ=0.2 mm or so, and the stem stop shoulder is a ball wedge 06s with its diameter so equal to or so slightly bigger than its mating spherical socket 01s as to ensure that the first mating contact or the initial mating contact of the ball wedge shoulder and its spherical socket is at the edge circle and close to the sphere's great circle of the ball wedge to tend to produce an infinite sealing stress.

Figure 3A:
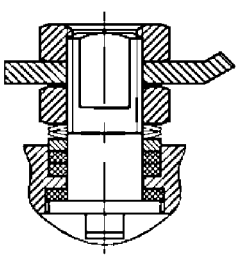
FIG. 3a is a conventional stem assembly including a group of plain packing rings for stem cylinder seals and a mating of plain shoulders and gaskets for stem shoulder seals, shown in cross-sectional elevation.
Figure 3B:
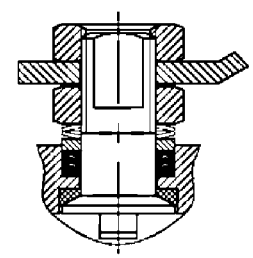
FIG. 3b is a conventional stem assembly including a set of V-packing rings for stem cylinder seals and a mating of taper or ball shoulders and conical or spherical gaskets for stem shoulder seals, shown in cross-sectional elevation.

In the traditional stem assembly of FIG. 3a, the sealing power provided by the fastening nut is axial, which is just in direct need of stem shoulder seals but not in direct need of stem cylinder seals; what the stem shoulder seal needs an axially clamping force, while what the stem cylinder seal needs a radially clamping force; that is to say, the stem cylinder seal needs a sealing power far bigger than the stem shoulder seal. However, the stem shoulder sealing gasket will be worn or broken and result in a sealing failure when the sealing power is big enough to make the stem cylinder seal operative. In the improved traditional stem assembly of FIG. 3b, the stem cylinder seal has air bubbles between male and female V-rings causing a too great volumetric change to be capable of retaining pressure by Belleville washer's regulation or compensation when temperature changes, although the improved V-rings can provide a radial component for a stem cylinder seal and improve the synchronizing characteristic of a stem cylinder seal and a stem shoulder seal before losing their wedging functions. Besides, the plain gasket shoulder assembly in FIG. 3a and the conical gasket shoulder assembly in FIG. 3b will create a leak and cause a leakage to atmosphere when the stem inclines under operational and non-operational loads. However, if using a spherical gasket shoulder assembly instead of the conical gasket shoulder assembly in FIG. 3b, the thrust gasket between the stem shoulder and thrust socket shall be of nonmetal unsuitable for high temperature and high pressure service, although there is no leak with the spherical gasket shoulder assembly when the stem inclines under operational and non-operational loads. If using the triangle-sectional bushing or ring as the stem cylinder seal and using the ball wedge/spherical socket mating arrangement as the stem shoulder seal, the stem sealing assembly will have a stem cylinder seal fully matched with a stem shoulder seal, and will become very desirable and get rid of all the above-mentioned drawbacks of using the stem seals shown in FIGS. 3a and 3b. It should be pointed out that changing the forming angles of a triangle-sectional bushing or ring can adjust the matching characteristic of stem cylinder seals and stem shoulder seals.

The ball valve shown in FIGS. 1, 6, 7 and 8 consists of body 01, seat 02, closure or obturator ball 03, trapezoid gasket 04, body insert 05, stem 06, antistatic spring 07 and ball 08, triangle-sectional bushing or ring 09, gland 10, Belleville washer 11, hexagonal nut 12, locking washer 13, handle 14 and stop pin 15. In traditional senses, it is not difficult for those skilled in the art to understand those parts not related in the above-mentioned descriptions, so we do not detail them again.

Figure 9:
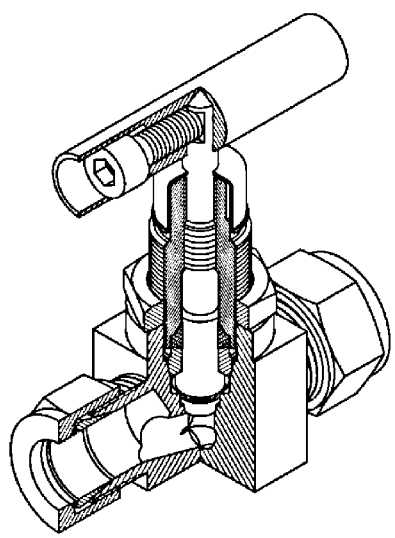
FIGS. 9, 10 and 11 are a ball wedge needle valve including a triangle-sectional bushing or ring for stem cylinder seals and two pairs of ball wedge/spherical socket mating arrangements, one of which is a shutoff pair and the other, a body seal pair. In these three drawings, like numerals indicate the same component.
Figure 10:
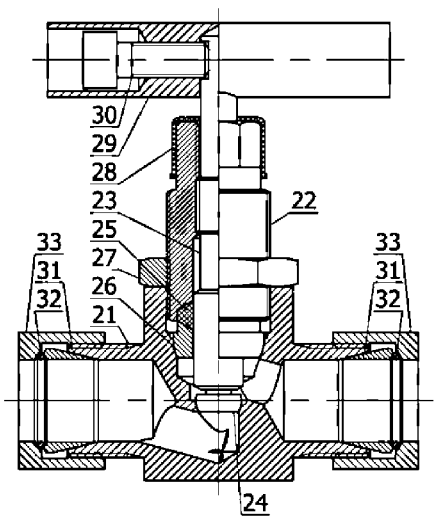
Figure 11:
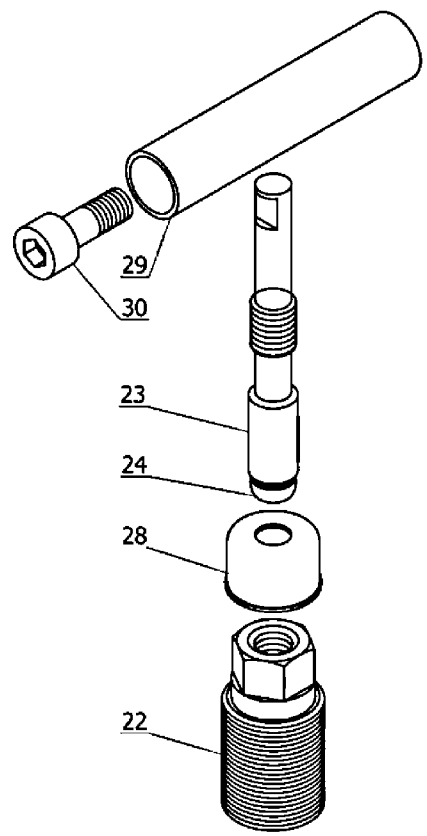
Figure 11:
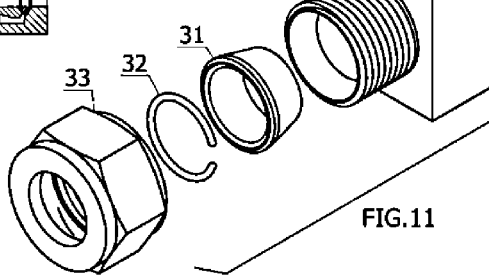

What is shown in FIGS. 9, 10 and 11 is the same needle valve, a ball wedge needle valve. In these three drawings, each like reference numeral indicates the same component, with number 21 for body, 22 for bonnet, 23 for stem, 24 for ball wedge disc, 25 for triangle-sectional bushing or ring, 26 for ball wedge seal, 27 for locking nut, 28 for boot, 29 for handle, 30 for screw, 31 for sealing ferrule, 32 for holding ferrule and 33 for driving nut. In the ball wedge needle valve, there is a triangle-sectional bushing or ring 25 used as the stem seal, a mating of ball wedge 26 and spherical socket used as the body seal and another mating of ball wedge 24 and spherical socket used as the valve closure in accordance with the invention. It is not difficult for those skilled in the art to understand those parts, so the detailed description of the ball wedge needle valve is not necessary.

The above-mentioned ball valve and needle valve are only two valve examples used to describe the designs in accordance with the invention. Anybody skilled in the art can follow the above-mentioned descriptions to use the triangle-sectional bushing or ring as the stem cylinder seal in other valves and machines, and use the ball wedge/spherical socket mating arrangement as the stem shoulder seal and the closure pair in other valves and as the spindle thrust bearing and seals in other machines.

What is claimed is:

1. A stem cylinder seal comprising:
   a bushing as a sealing member and upper and lower conical sockets, the bushing being compressed between the upper and lower conical sockets and not needing any restriction from a stuffing box, the upper and lower conical sockets and the bushing being configured to receive a movable stem therethrough, the upper conical socket being integrated in a gland, and the lower conical socket being integrated at the outside of a thrust step of an exit opening through which the movable stem extends;
   wherein a section of the bushing is a truncated triangle with an untruncated side of the truncated triangle being the generatrix of a cylindrical inner surface of the bushing used for sealing the stem cylinder, a truncated side of the truncated triangle being the generatrix of a first tapered outer surface of the bushing used for sealing the lower conical socket, and the other truncated side of the truncated triangle being the generatrix of the other second tapered outer surface of the bushing used for receiving a compressive force from the gland, and the truncating side of the truncated triangle being the generatrix of the short cylindrical outer surface of the bushing used for providing a wearing and compressing allowance for the bushing.

2. The stem cylinder seal of claim 1, wherein the bushing is substantially radially and axially bound between the upper and lower conical sockets.

3. The stem cylinder seal of claim 1, wherein the gland is resiliently biased towards the lower conical socket.

4. The stem cylinder seal of claim 1, wherein the truncated triangle is a truncated equilateral triangle.

5. The stem cylinder of claim 1, wherein the bushing is formed from a material selected from the group consisting of PTFE and flexible graphite.

6. The stem cylinder seal of claim 1, wherein the bushing is substantially radially and axially bound by only the upper conical socket, the lower conical socket and the movable stem.

7. A ball wedge/spherical mating arrangement of stem shoulder seal, comprising:
   a ball wedge integrally formed at a movable stem end; and
   a spherical socket integrally formed at the inside of a thrust step of an exit opening from which the movable stem extends, wherein the ball wedge has a diameter that is either equal to or greater than a diameter of the spherical socket; and wherein the initial mating contact between the ball wedge and the spherical socket is close to the ball wedge's diameter of the ball wedge as to result in a mating arrangement with a small wedging angle defined by the ball wedge and the spherical socket.

8. The mating arrangement of claim 7, wherein the ball wedge is an annulus having a curvature and wherein the socket is an annulus having a curvature, and wherein the curvature of the annulus of the ball wedge is smaller than the curvature of the annulus of the socket annulus.

9. The ball wedge/spherical mating arrangement of claim 7, wherein the ball wedge has an external surface, wherein the socket has an internal surface; wherein the initial mating contact is between the external and internal surfaces; and wherein the external surface has a hardness that is greater than the internal surface.

10. A stem-sealing arrangement for use with a ball valve comprising:
    a stem cylinder seal including:
       a bushing as a sealing member and upper and lower conical sockets, the bushing being compressed between the upper and lower conical sockets and not needing any restriction from a stuffing box, which are configured to receive a movable stem therethrough, the upper conical socket being integrated in a gland, and the lower conical socket being integrated at the outside of a thrust step of an exit opening through which the movable stem extends;
    wherein a section of the bushing is a truncated triangle, with an untruncated side of the truncated triangle being the generatrix of a cylindrical inner surface of the bushing used for sealing the stem cylinder, a truncated side of the truncated triangle being the generatrix of a first tapered outer surface of the bushing used for sealing the said lower conical socket, and the other truncated side of the truncated triangle being the generatrix of the other second tapered outer surface of the bushing used for receiving a compressive force from the gland, and the truncating side of the truncated triangle being the generatrix of the short cylindrical outer surface of the bushing used for providing a wearing and compressing allowance for the bushing;
    and a stem shoulder seal including:
       a ball wedge integrally formed at a movable stem end; and a spherical socket integrally formed at the inside of a thrust step of an exit opening from which the movable stem extends, wherein the ball wedge has a diameter that is either equal to or greater than a diameter of the spherical socket; and wherein the initial mating contact between the ball wedge and the spherical socket is close to a diameter of the ball wedge as to result in a mating arrangement with a small wedging angle defined by the ball wedge and the spherical socket.

11. The stem sealing arrangement of claim 10, wherein the ball wedge is an annulus having a curvature and wherein the socket is an annulus having a curvature, and wherein the curvature of the annulus of the ball wedge is smaller than the curvature of the annulus of the socket annulus.

* * * * *